United States Patent
Williams et al.

(10) Patent No.: US 8,322,788 B2
(45) Date of Patent: Dec. 4, 2012

(54) BASE RETAINING SYSTEM WITH A BELT TENSION INDICATOR

(75) Inventors: Bruce Williams, Narvon, PA (US); Andrew Lehman, Lancaster, PA (US); Scott Anderson, East Earl, PA (US)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 154 days.

(21) Appl. No.: 12/966,561

(22) Filed: Dec. 13, 2010

(65) Prior Publication Data

US 2011/0140491 A1 Jun. 16, 2011

(30) Foreign Application Priority Data

Dec. 11, 2009 (CN) .................. 2009 2 0174331 U

(51) Int. Cl.
*B60N 2/28* (2006.01)
*A47D 1/10* (2006.01)

(52) U.S. Cl. .................................................. 297/256.16
(58) Field of Classification Search .............. 297/256.16
See application file for complete search history.

(56) References Cited

U.S. PATENT DOCUMENTS

| | | | | |
|---|---|---|---|---|
| 4,634,177 A | * | 1/1987 | Meeker ................ | 297/256.16 X |
| 5,058,283 A | * | 10/1991 | Wise et al. ................. | 33/371 |
| 6,454,350 B1 | * | 9/2002 | Celestina-Krevh et al. .................... | 297/256.16 X |
| 6,672,664 B2 | * | 1/2004 | Yanaka et al. ............ | 297/256.16 |
| 6,705,676 B1 | * | 3/2004 | Berringer et al. ......... | 297/256.16 |
| 6,863,286 B2 | * | 3/2005 | Eros et al. ............. | 297/256.16 X |
| 7,040,694 B2 | * | 5/2006 | Sedlack ................ | 297/256.16 X |
| 7,207,628 B2 | * | 4/2007 | Eros ...................... | 297/256.16 X |
| 7,819,472 B2 | * | 10/2010 | Hutchinson et al. ...... | 297/256.16 |
| 7,926,874 B2 | * | 4/2011 | Hendry .................... | 297/256.16 |
| 7,988,230 B2 | * | 8/2011 | Heisey et al. ......... | 297/256.16 X |
| 2003/0164632 A1 | * | 9/2003 | Sedlack ................ | 297/256.16 |
| 2004/0207243 A1 | * | 10/2004 | Sedlack ................ | 297/256.16 |
| 2005/0184567 A1 | * | 8/2005 | Carpenter et al. ........ | 297/256.16 |
| 2006/0082200 A1 | * | 4/2006 | Woellert et al. ....... | 297/256.16 X |
| 2008/0296944 A1 | * | 12/2008 | Nakagawa et al. .. | 297/256.16 X |
| 2009/0066130 A1 | * | 3/2009 | Shafer et al. ............. | 297/256.16 |
| 2009/0066131 A1 | * | 3/2009 | Hendry .................... | 297/256.16 |
| 2011/0074194 A1 | * | 3/2011 | Weber et al. ......... | 297/256.16 X |
| 2011/0254331 A1 | * | 10/2011 | Nagelski et al. ..... | 297/256.16 X |

* cited by examiner

*Primary Examiner* — Rodney B White
(74) *Attorney, Agent, or Firm* — Morris Manning & Martin, LLP; Tim Tingkang Xia, Esq.

(57) ABSTRACT

An infant safety seat with an adjustable accommodating space includes a multi-layer cushioning insert which is detachably insertable into an infant safety seat for accommodating an infant in different stages of growth with different sizes. The multi-layer cushioning insert comprises a first cushioning part and a second cushioning part both may detachably to overlap each other and connect into the accommodating space to provide the necessary support for keeping an infant in proper postural position. The first cushioning part includes a U-shaped head cushion part, U-shaped body cushion part and U-shaped leg cushion part for restricting the side moving of the infant. Further, for accommodating a smaller infant, the second cushioning part can be detachably overlapped onto the first cushioning part for further reducing the side moving space and upright moving space of the baby in the infant safety seat.

19 Claims, 3 Drawing Sheets

BASE RETAINING SYSTEM WITH A BELT TENSION INDICATOR

CROSS-REFERENCE TO RELATED APPLICATIONS

This non-provisional application claims priority under 35 U.S.C. §119(a) on Patent Application No(s). 200920174331.1 filed in People's Republic of China on Dec. 11, 2009, the entire contents of which are hereby incorporated by reference.

BACKGROUND OF THE INVENTION

The present invention relates generally to a base retaining system with a belt tension indicator for indicating whether a base is installed correctly on a vehicle seat or not. More particularly, the present invention relates to an indicating mechanism including a colored rotor and a rotatable depressor, when the base is installed correctly, the colored rotor would be dialed by the rotatable depressor to show a specific color through a window.

DESCRIPTION OF THE RELATED ART

Child safety seats or infant carriers are in wide use, and more and more countries having the regulation requires baby and infant to use child safety seats and infant carriers while they traveling in a vehicle. However, to install the child safety seats and infant carriers directly on the vehicle seat merely with the vehicle seat belt, would be troublesome and waste of time.

For troubleshooting, an improvement is provided with a base that can be secured to a vehicle seat before use it to engage with a child safety seat or infant carrier by a releasable locking mechanism thereon. The user can remove the child safety seat and infant carrier from the base by manipulating the releasable locking mechanism, without further suffering from the troublesome of tying and untying vehicle seat belt again and again.

However, no matter how a base is tightened to the vehicle seat, the sliding between the base and the belt would occurred as soon as a side force is applied to, especially when the vehicle is turning left or right in high speed, this would cause the child safety seat or infant carrier as well as the base wobbling or swinging from time to time, and makes the little occupant who sitting thereon feel badly uncomfortable.

SUMMARY OF THE INVENTION

To solve the above-mentioned problem, the present invention provides a base retaining system with a belt tension indicator, with a main purpose to indicate if the base is installed correctly or not. People installing the bases in car often are uncertain if the base is installed tight enough. The indicating mechanism is designed for user to read if the vehicle belt is tight enough or not, and thereby to get a feedback indicating whether it is ok (green) or bad (red).

The base retaining system with a lock-off indicating mechanism of the present invention includes a belt for securing the base to a vehicle seat, and a lock-off indicating mechanism for releasably locking the belt to the base, so as to prevent the base from wobbling relative to the vehicle seat.

The lock-off indicating mechanism may include a biting compartment, a covering plate, a holding plate and a colored rotor. The biting compartment is formed on the base in a place that the belt could pass thereover during in tightened condition; the covering plate has one end pivoted to the base beside the biting compartment, and another end pivoted with a rotatable depressor for pressing the belt into the biting compartment during the covering plate is in a closed position; the holding plate has one end pivoted to the base beside the biting compartment, and engagable with the covering plate for holding the covering plate in the closed position so as to keep biting the belt in the biting compartment; and the colored rotor is dialable by one end of the rotatable depressor, to reveal a selected color area when the rotatable depressor has been depressed the belt and closed to the covering plate.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
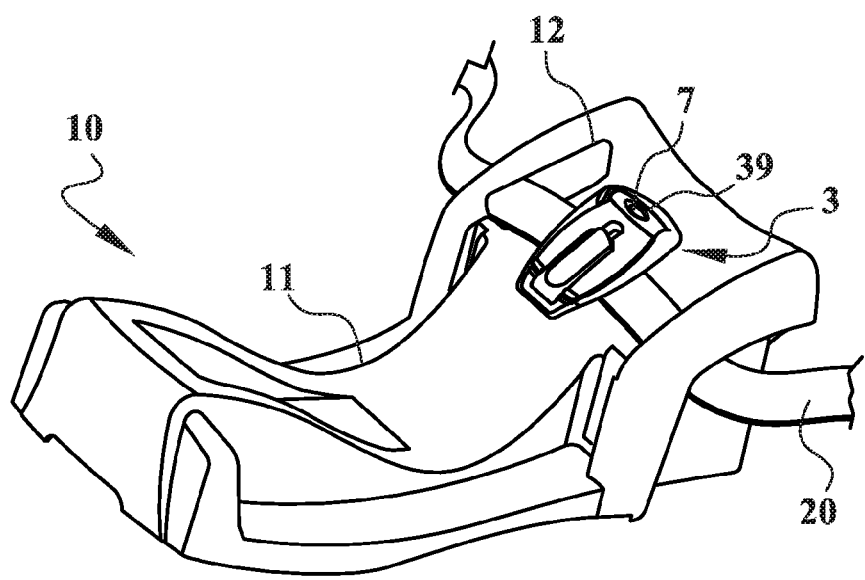
FIG. 1 is a perspective view illustrating a base being secured by a belt which is bitten by a lock-off indicating mechanism according to the present invention.

Reference will now be made in detail to the preferred embodiments of the present invention, examples of which are illustrated in the accompanying drawings.

Referring to FIGS. 1 to 4, an embodiment of the base retaining system with a lock-off indicating mechanism according to the present invention, includes a belt 20 for securing a base 10 to a vehicle seat, and a lock-off indicating mechanism 3 for releasably locking the belt 20 to the base 10 so as to prevent the base 10 from wobbling relative to the vehicle seat. The lock-off indicating mechanism 3 includes at least a biting compartment 32, a covering plate 31, a holding plate 33 and a colored rotor 35.

Referring to FIG. 1, the base 10 may be formed integrally in one piece or an assembly of multiply piece, having a curved supporting surface 11 for support a infant travel seat thereon and a pair of side guiding openings 12 for allowing a belt passing therethrough so as to secure the base 10 to the vehicle seat.

Figure 2:
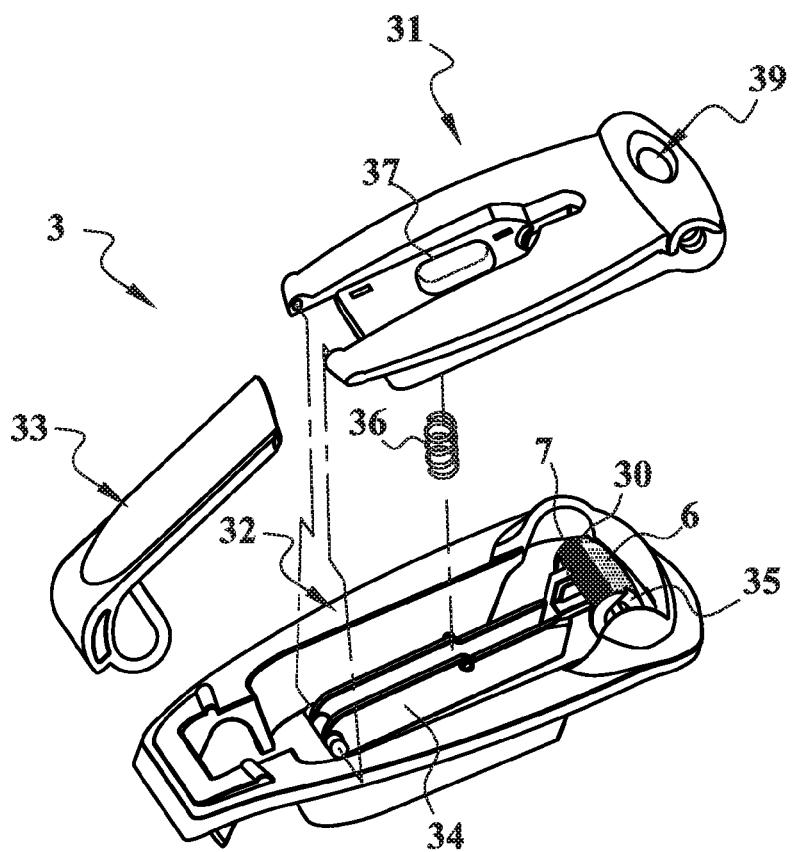
FIG. 2 is an exploded perspective view showing the structure of the lock-off indicating mechanism.
Figure 3:
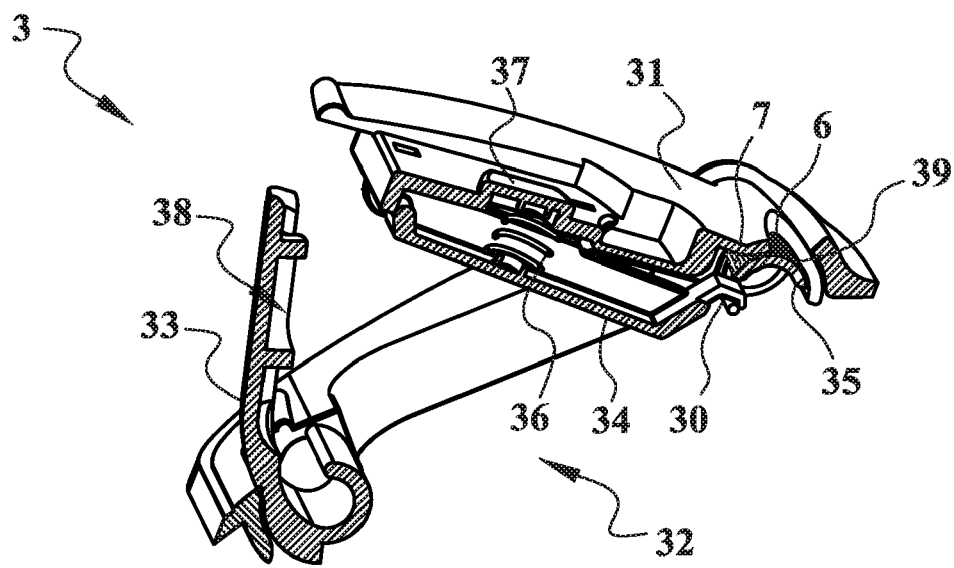
FIG. 3 is a perspective view illustrating the operation of the lock-off indicating mechanism.
Figure 4:
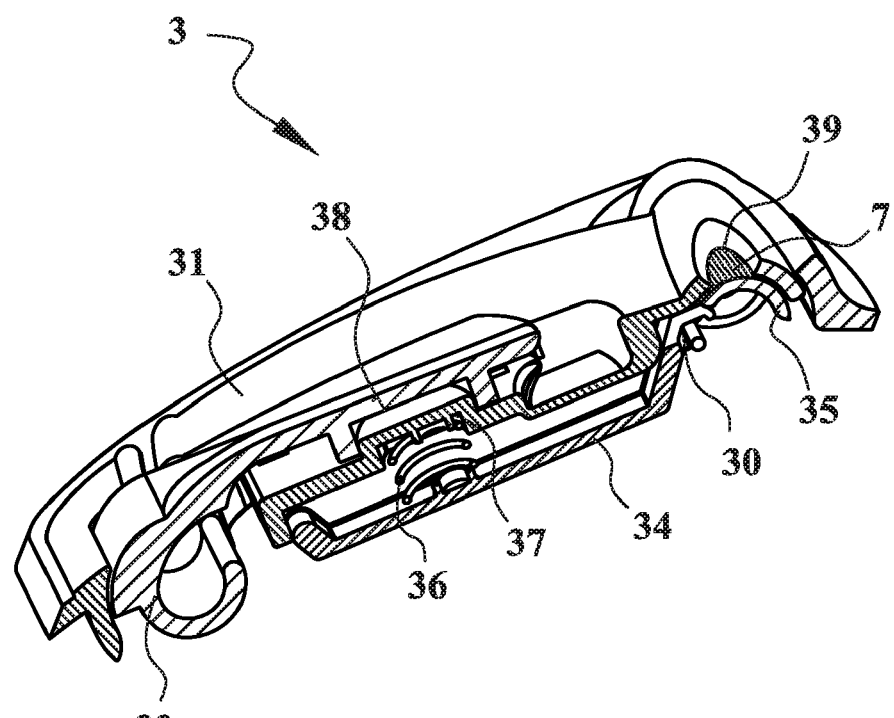
FIG. 4 is a cross-sectional view showing the structure of the lock-off indicating mechanism.

Referring to FIGS. 2 and 3, the biting compartment 32 is formed on the base 10 between the pair of side guiding openings 12 where the belt 20 could pass is passing thereover.

The covering plate 31 has one end coaxial with the colored rotor 35 and pivoted to one end of the biting compartment 32 for closing the biting compartment 32 when being rotated to a closed position, and another end pivoted with a rotatable depressor 34 for pressing the belt 20 into the biting compartment 32 when the covering plate 31 is rotated to and positioned in the closed position.

preferably, a resilient element 36 may be mounted between the covering plate 31 and the rotatable depressor 34, so as to keep the rotatable depressor 34 in an opened position. In one embodiment, the resilient element 36 is a compression spring for biasing the rotatable depressor 34 downward and keeping in the opened position. When the covering plate 31 is carrying the rotatable depressor 34 to press the belt 20, it would compress the resilient element 36 and cause the rotatable depressor 34 to rotate and close to the covering plate 31 to a closed position.

The holding plate 33 has one end pivoted to another end of the biting compartment 32 opposite to the covering plate 31, and engagable with the covering plate 31 for holding the covering plate 31 in the closed position, so as to keep biting the belt 20 in the biting compartment 32. The holding plate 33 may be biased by a spring (not shown) to hold the covering plate 31 in the closed position.

Preferably, the covering plate 31 is formed with a first engagement portion 37, and the holding plate 33 is formed with a second engagement portion 38 for engaging with the first engagement portion 37 so as to keep the covering plate 31 in the closed position. Referring to the embodiment of FIGS. 3 and 4, the first engagement portion 37 may be in type of a post or protruded block, and the second engagement portion 38 may be in type of a rabbet or an indent for engaging with the post or protruded block of the first engagement portion 37.

The colored rotor 35 is a rotatable element which has at least a first color area 6 and a second color area 7, mounted in the biting compartment 32 and biased by a spring (not shown) for self-keeping the first color area 6 to reveal in a window 39 when the rotatable depressor 34 has not yet pressed the belt 20 into the biting compartment 32.

The covering plate 31 may be formed with a window 39 for revealing the first color area 6 and the second color area 7. The colored rotor 35 is formed with an engaging slot 30 for engaging with the free end of the rotatable depressor 34 and dialable by the free end of the rotatable depressor 34. When the rotatable depressor 34 has been pressed the belt 20 into the bottom of the biting compartment 32 and being closed to the covering plate 31, the free end of the rotatable depressor 34 would dial the colored rotor 35 to rotate and reveal the second color area 7 in the window 39.

Figure 5:
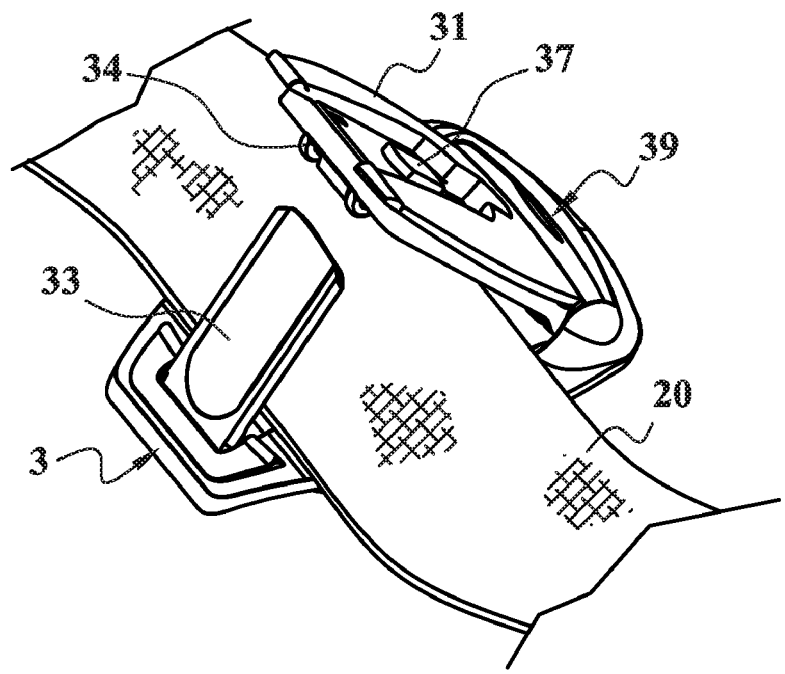
FIG. 5 is a perspective view illustrating the operation of the lock-off indicating mechanism.
Figure 6:
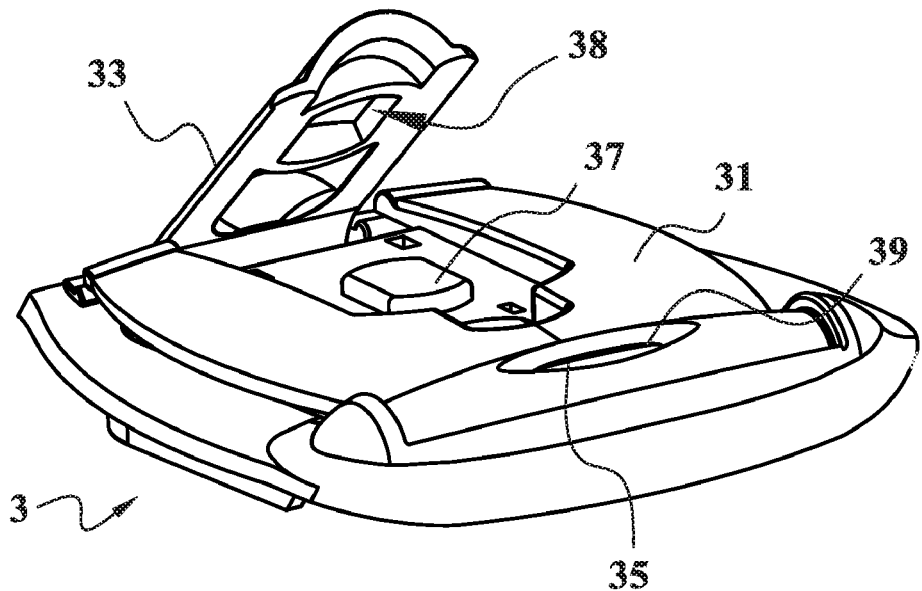
FIG. 6 is another perspective view illustrating the operation of the lock-off indicating mechanism.

Referring to FIGS. 5 and 6, before tying the base 10 to a vehicle seat, the belt 20 is passing through the pair of side guiding openings 12 and secure its free end to an anchor which is mounted within the vehicle seat. By this way, may secure the base 10 to the vehicle seat tightly.

In order to inhibit the sliding between the base 10 and belt 20, the user may rotate the covering plate 31 to close the biting compartment 32, thus would carry the rotatable depressor 34 to press the belt 20 into the biting compartment 32. After being closed the covering plate 31, the user may rotate the holding plate 33 to engage and lock the covering plate 31 in the closed position.

If the belt 20 is in a good tightened condition, it would reactively force the rotatable depressor 34 to rotate and compress the resilient element 36 and cause the free end of the rotatable depressor 34 to dial the colored rotor 35 upward through the engaging slot 30 until being closed to the covering plate 31 in a closest position.

When the rotatable depressor 34 being reached the closest position, the colored rotor 35 is dialed to turn to reveal its second color area 7 through the window 39.

The second color area 7 may be embodied as a green color, blue or a specific color, When the second color area 7 revealed, it means the belt 20 is in a tightened condition and the sliding between the base 10 and belt 20 is prohibited, that would diminish or prevent the base 10 from wobbling during in use.

When the holding plate 33 is opened to release the covering plate 31 from the closed position, the resilient element 36 shall bias against the covering plate 31 and the rotatable depressor 34 to rotate freely; in the meantime, the free end would stop to dial the colored rotor 35, and be urged by a spring (not shown) for self-keeping to reveal the first color area 6 through the window 39. By this way to warning the user that the base 10 is released and the base 10 may slide along the belt 20.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A base retaining system with a belt tension indicator, includes a belt for securing a base to a vehicle seat, and a lock-off indicating mechanism for releasably locking the belt to the base so as to prevent the base from wobbling relative to the vehicle seat, wherein the lock-off indicating mechanism includes:
    a biting compartment, formed on the base where the belt could pass thereover in a tightened condition;
    a covering plate, having one end coaxial with a colored rotor and pivoted to a first end of the biting compartment, and having another end pivoted with a rotatable depressor for pressing the belt into the biting compartment when the covering plate is rotated and positioned in a closed position,
        wherein the rotatable depressor has a free end, and the colored rotor is formed with an engaging slot for the free end of the rotatable depressor to be inserted therein, so as to be diable by the rotatable depressor; and
        wherein when the rotatable depressor presses the belt into the biting compartment, the free end of the rotatable depressor dials the colored rotor to rotate to reveal a selected color area; and
    a holding plate, having one end pivoted to a second end of the biting compartment, and engagable with the covering plate for holding the covering plate in the closed position so as to bite the belt in the biting compartment.

2. The base retaining system with a belt tension indicator of claim 1, wherein the colored rotor is formed with a first color area and a second color area, and the first color area is revealed in a window formed on the covering plate when the covering plate is positioned in an opened position.

3. The base retaining system with a belt tension indicator of claim 1, wherein when the rotatable depressor rotates and presses the belt into the biting compartment, the colored rotor is dialed by the free end of the rotatable depressor to rotate and reveal a second color area in a window formed on the covering plate.

4. The base retaining system with a belt tension indicator of claim 1, further includes a resilient element for keeping the rotatable depressor in an opened position; when the covering plate rotates from an opened position to the closed position, the resilient element is compressed to drive the rotatable depressor to rotate and press the belt into the biting compartment.

5. The base retaining system with a belt tension indicator of claim 4, wherein the resilient element is a compression spring for keeping the rotatable depressor in the opened position.

6. A base retaining system with a belt tension indicator of claim 1, wherein the covering plate is formed with a first engagement portion, and the holding plate is formed with a second engagement portion for engaging with the first engagement portion so as to keep the covering plate in the closed position.

7. The base retaining system with a belt tension indicator of claim 6, wherein the first engagement portion is a post, and the second engagement portion is a rabbet engagable with the post.

8. The base retaining system with a belt tension indicator of claim 6, wherein the first engagement portion is a protruded block, and the second engagement portion is an indent engagable with the protruded block.

9. The base retaining system with a belt tension indicator of claim 1, wherein the holding plate is biased by a spring thereby to engage and hold the covering plate in the closed position.

10. The base retaining system with a belt tension indicator of claim 1, wherein the covering plate is formed with a window for revealing the selected color area when the rotatable depressor presses the belt into the biting compartment and rotates to close to the covering plate.

11. A base retaining system with a belt tension indicator, includes a belt for securing a base to a vehicle seat, and a lock-off indicating mechanism for releasably locking the belt to the base so as to prevent the base from wobbling relative to the vehicle seat, wherein the lock-off indicating mechanism includes:
  a biting compartment, formed on the base where the belt could pass thereover in a tightened condition;
  a covering plate, having one end coaxial with a colored rotor and pivoted to a first end of the biting compartment, and having another end pivotally fixed to one end of a rotatable depressor;
  a holding plate, having one end pivoted to a second end of the biting compartment, and engagable with the covering plate for holding the covering plate in a closed position so as to bite the belt in the biting compartment,
  a resilient element for keeping the covering plate and the rotatable depressor in an opened position,
  wherein when the covering plate and the rotatable depressor rotates around the colored rotor from the opened position to the closed position, the resilient element is compressed, and the covering plate and the rotatable depressor presses the belt into the biting compartment, such that a free end of the rotatable depressor dials the colored rotor to rotate to reveal a selected color area; and
  wherein the closed position is maintained by engaging the holding plate with the covering plate.

12. The base retaining system with a belt tension indicator of claim 11, wherein the colored rotor is formed with a first color area and a second color area, and when the covering plate is in the opened position, the first color area is biased and revealed in a window formed on the covering plate.

13. The base retaining system with a belt tension indicator of claim 12, wherein when the covering plate is in a closed position, the second color area is revealed in the window formed on the covering plate.

14. The base retaining system with a belt tension indicator of claim 11, wherein the resilient element is a compression spring for keeping the covering plate and the rotatable depressor in the opened position.

15. A base retaining system with a belt tension indicator of claim 11, wherein the covering plate is formed with a first engagement portion, and the holding plate is formed with a second engagement portion for engaging with the first engagement portion so as to keep the covering plate in the closed position.

16. The base retaining system with a belt tension indicator of claim 15, wherein the first engagement portion is a post, and the second engagement portion is a rabbet engagable with the post.

17. The base retaining system with a belt tension indicator of claim 15, wherein the first engagement portion is a protruded block, and the second engagement portion is an indent engagable with the protruded block.

18. The base retaining system with a belt tension indicator of claim 11, wherein the holding plate is biased by a spring thereby to engage and hold the covering plate in the closed position.

19. The base retaining system with a belt tension indicator of claim 11, wherein the covering plate is formed with a window for revealing the selected color area when the rotatable depressor rotates to the closed position and presses the belt into the biting compartment.

* * * * *